Nov. 8, 1960   O. C. MILLHOFF   2,958,897
MOLD OPENING DEVICE
Filed Jan. 19, 1959                                4 Sheets-Sheet 1
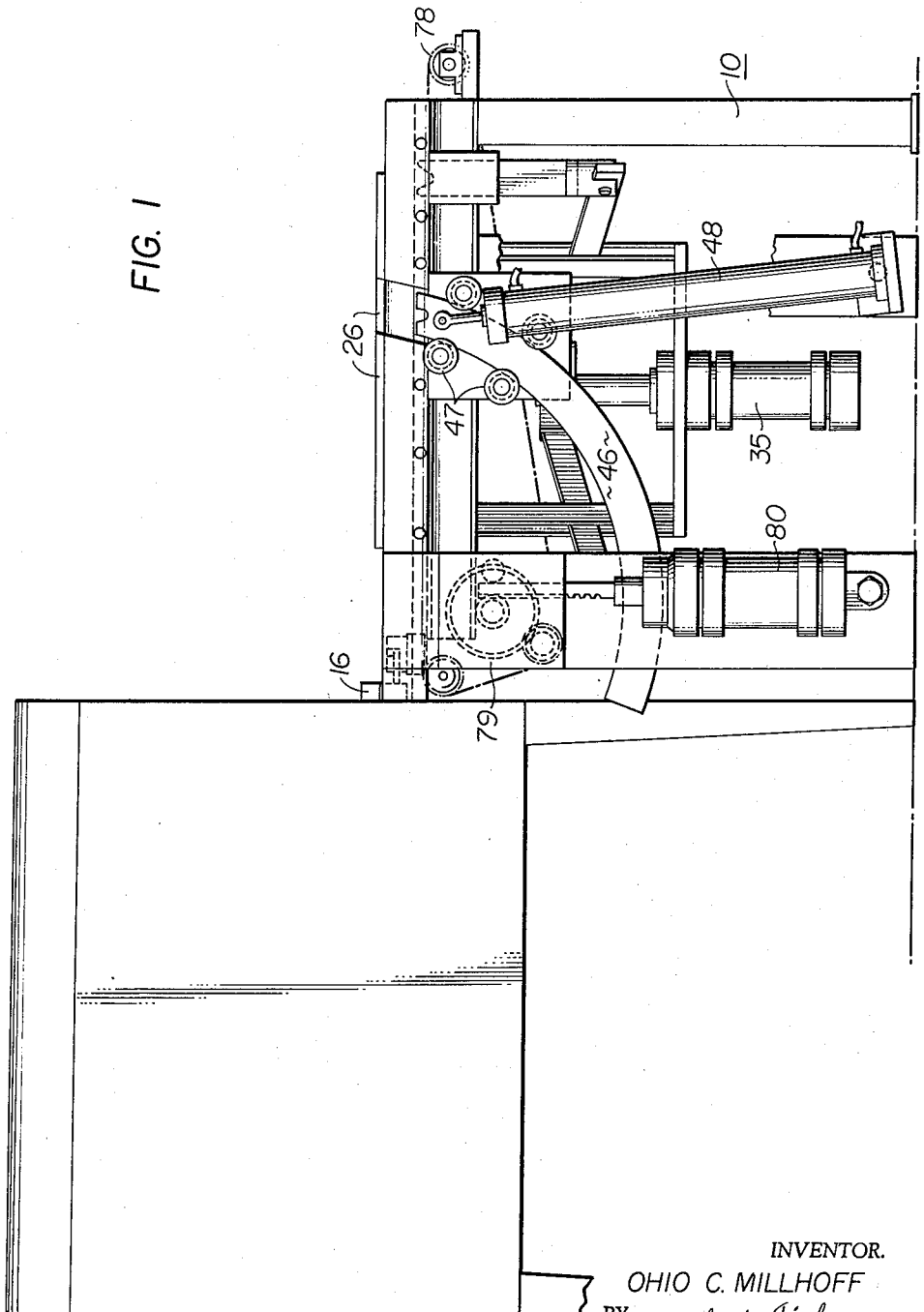
FIG. I
INVENTOR.
OHIO C. MILLHOFF
BY
Pyle & Fisher
ATTORNEYS

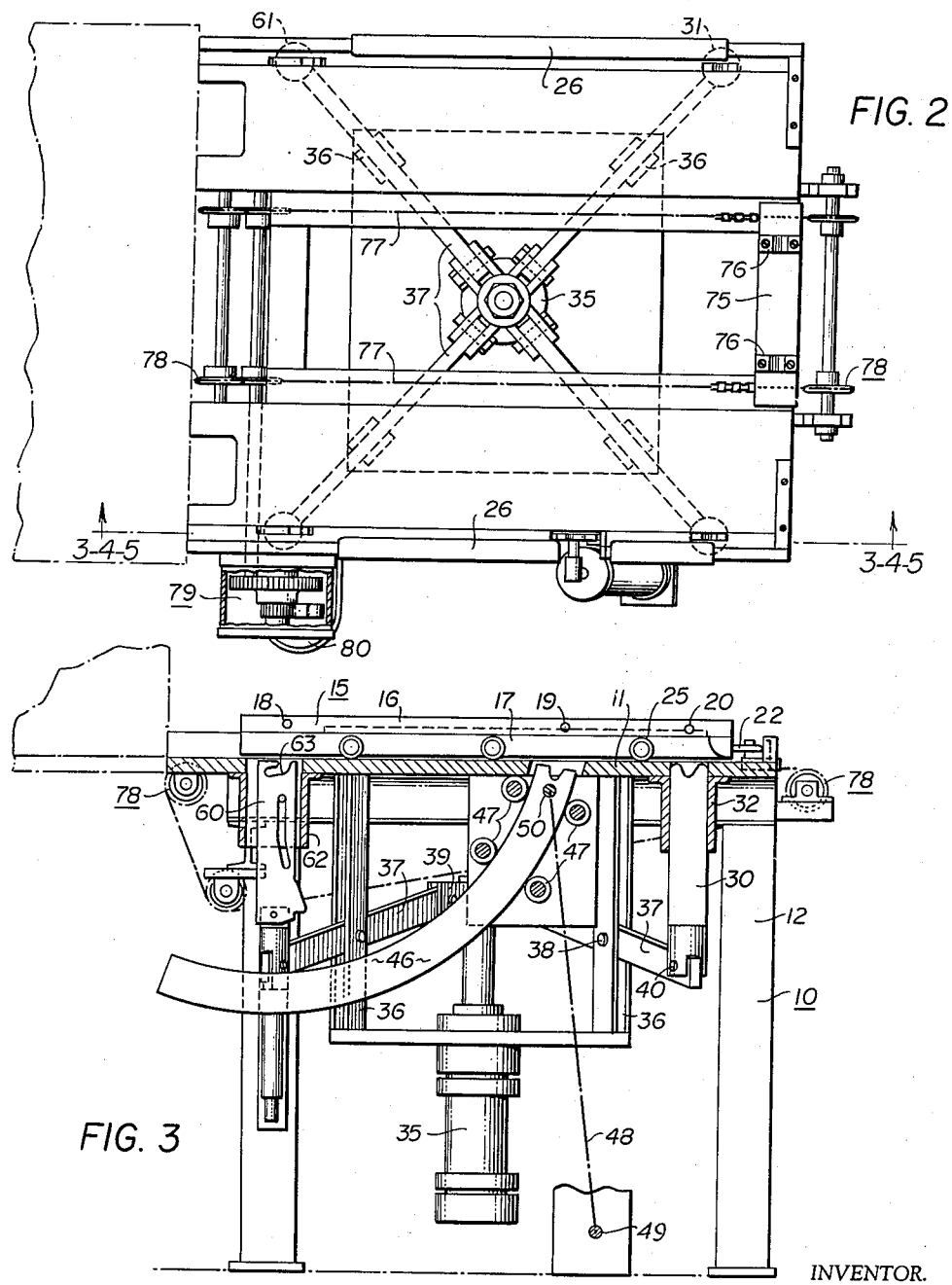

Nov. 8, 1960  O. C. MILLHOFF  2,958,897
MOLD OPENING DEVICE

Filed Jan. 19, 1959  4 Sheets-Sheet 3

INVENTOR.
OHIO C. MILLHOFF
BY Pyle & Fisher
ATTORNEYS

Nov. 8, 1960   O. C. MILLHOFF   2,958,897
MOLD OPENING DEVICE

Filed Jan. 19, 1959   4 Sheets-Sheet 4

INVENTOR.
OHIO C. MILLHOFF
BY *Pyle & Fisher*
ATTORNEYS

United States Patent Office 2,958,897
Patented Nov. 8, 1960

2,958,897

MOLD OPENING DEVICE

Ohio C. Millhoff, Barberton, Ohio, assignor to
The Nye Rubber Company

Filed Jan. 19, 1959, Ser. No. 787,531

9 Claims. (Cl. 18—2)

This invention relates to vulcanizing molds, and relates more specifically to mechanically opened rubber mold machinery and similar plate-form equipment. This invention is a continuation-in-part of my former application, "Mold Opening Devices," filed February 27, 1957, S.N. 642,881, and now abandoned.

Matched plate sets, with each plate provided with partial cavities, have long been used for molding rubber. A slab of uncured stock is placed between the plates, and this "sandwich" subjected to heat and pressure. Molded forms interconnected by a waste web result. Other mold structures have been developed, but the described mold form still is in wide use.

Summarizing, therefore, this invention is operable in a field where matched plates need to be separated by power and then tilted.

As an example of the field, refer to U.S. Letters Patent No. 2,231,254, issued February 11, 1941, to inventor A. B. Cleveland. This patent teaches the use of spaced hydraulic cylinders to first lift a top mold member and thereafter tilt the member to provide access. The Cleveland device is a tire mold, and the mold members are permanent molds.

The problem solved by the present invention is the mechanical operation of any mold couple designed to fit the operating apparatus. Thus, the common platen press is provided with a service tool which enables an operator to improve production, reduce personal fatigue, and run larger size molds.

Although the Cleveland device is suggestive of the general art, it is designed for one type of production service, and this invention another. The problems and their solution are not similar.

It is the prime object of this invention to provide apparatus which will operate a mold couple; will mechanically insert and withdraw the mold couple from a separate platen press; will accept and operate interchangeable mold couples; will release the couple fully while the couple is in the press; will break the mold couple apart with an assured, even breaking movement regardless of unequal clinging forces between the sections of the mold couple; and will open the mold rapidly after the clinging force is broken.

Other objects and a fuller understanding of the invention may be had by referring to the following description and claims, taken in conjunction with the accompanying drawings, in which:

Figure 1 is a side view of a plate-side platen press, with the apparatus of this invention associated therewith to service mold members cured in the press;

Figure 2 is a top plan view of the apparatus of this invention with only a fragmentary portion of the platen press;

Figures 3, 4 and 5 are side elevations taken along the indicated line of Figure 2, each view being in a different operative position.

Figure 4:
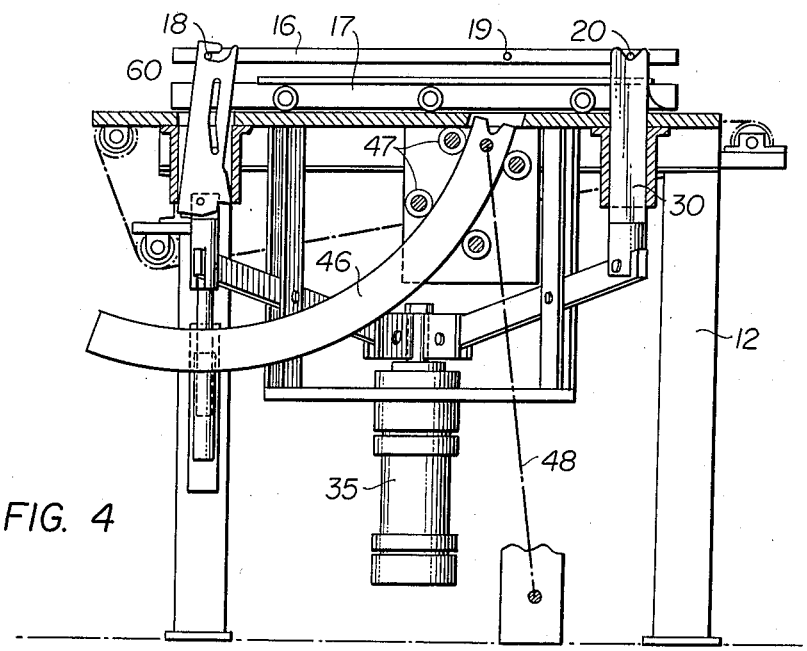

The usual type of rubber mold comprises a mold couple mated together to define rubber molding cavities within the couple. There are many methods of causing rubber to enter into the mated cavity chambers, the conventional method being to place a slug of rubber in each cavity, or to place a large slab of rubber in a sandwich condition between the molds before the mold members are closed upon one another. Furthermore, there are similar types of mold structures employing two mold sections for molding materials other than rubber. Regardless of the material being molded, the problem of mold release and relative opening remains.

When two mated mold members have been closed under high pressure within the platen of a press, a very considerable force must be exerted to open the mold for servicing and removing the molded articles from the cavities. In smaller mold structures pinch bars or levers are normally employed with success. However, whenever the mold sizes become large and the cavities within them are large, usually a considerable force is required to open the molds and the time and energy consumed materially reduces the efficiency of the worker in a very short period of time. The mold members are quite heavy and hot, and consequently, much fatiguing labor must be exerted.

Consequently the mold separation and opening device of this invention as illustrated in the drawings is provided to quickly and conveniently break the mold members apart and swing the mold members away from one another for convenience in removing the molded articles and supplying new, uncured rubber stock in the case of rubber molding.

Prior to this invention there have been numerous mold handling devices which crack open a rubber mold and lift a top plate of the mold with respect to a bottom mold plate. Such devices are generally permanent installations employed for producing the same article continuously each day. They are not adapted to change. This invention not only provides improved operation, but finds its most outstanding virtue in being adaptable to a range of plate sizes and to the use of the apparatus with different plate couples without any adjustment in the apparatus or the molds.

Further, with respect to background, the molds which are served by the present invention are not in any way mutually hinged, but rather are mated by interlocking surfaces such as dowel pins. Highly accurate alignment of plate members requires such dowelling. Hinges become warped by heat, or can be misaligned by abuse. However, when plates are mated by interfitting dowelling, they must be separated along a rectilinear path until disengaged. The plate members cannot merely be swung apart by applying pressure at one edge of the mold.

Accordingly, as the description of the present invention proceeds, it will be noticed that a lifting mechanism is provided which locks to a lifting pin of one of the mold plates. Thus, there is provided a pivot which will not slip as the plate is later tilted.

The illustrated embodiment of the invention as set forth in the drawings is intended as an operable attachment which can be used with any one of a variety of associated apparatus, but is illustrated for descriptive purposes with a conventional side plate platen press. Such platen presses are common presses in the variety rubber molding art.

The illustrated embodiment of the invention incorporates a general, table-like construction indicated generally by the reference character 10. This table 10 has a bed portion 11 and is supported upon legs 12.

A mold couple 15 represents generally the type of rigid plate mold device with which the invention herein described is concerned. In the Cleveland patent, the mold members are permanent affairs and the actuating apparatus is employed to simply operate the permanent mold members. However, the large portion of variety molded goods are made in a volume which does not warrant a permanent mold machine including heat in the mold. Hence, a mold couple such as the couple 15 is employed and it is heated and compressed in a platen press similar to that illustrated in Figure 1. Therefore, the problem of operation of the mold device 15 is unique and requires special consideration. The mold couple 15 is made of sections 16 and 17 and may have more sections in many instances. Each mold section has a portion of a cavity adapted to mate with another portion of a cavity in the mated section. Usually there are a large number of mold cavities in each section in order that a multiplicity of finished molded pieces may be effected with each cure cycle. The manufacture and use of such mold couples as the couple 15 is well known and understood in the rubber art. The cavity sections must be properly aligned and must hold in that alignment against huge forces created by the closing of the mold sections in the platen press under many tons of pressure. The rubber turns slightly plastic and flows under the heat and pressure and tends to drive the mold couple sections laterally with respect to one another. Hence, the sections are aligned and held against displacement by large dowel pins 21. The dowel pins are usually tapered at their tip end in order to aid in the register of the pin with a mating cavity.

The mold couple 15 is exceptionally adapted for operation in the invention by the provision of wheels 25 which enable the mold couple to be wheeled into and out of the press, in order that the sections may be opened and the workpieces be removed or raw material inserted.

In the two sections mold couples 15, the upper section is equipped with lift pins 18, 19 and 20 positioned substantially as illustrated in Figure 3. Like pins are on the opposite side of section 16. The bed 11 is provided with cover plates 26 over the track area where the wheels 25 operate. Hence, when the couple 15 is withdrawn from the press and positioned upon the bed portion 11, the wheels 25 are confined under the plates 26 and therefore the section 17 cannot be lifted vertically with respect to the bed 11. Consequently, lifting forces applied to the pins 18 and 19 and 20 may cause a separation of the section 16 from the section 17. General practice prior to this invention was to use pinch bars and similar types of lever or cam apparatus to break apart the mold sections, whereafter winches or hoists of various types were employed to replace manual labor in larger sections, or in small sections, manual labor is still employed to do the lifting of the molded sections after the molds are broken. This invention provides a unique breaking and handling apparatus especially adapted for the larger and heavier mold apparatus to replace hand breaking operation or separation cam devices carried by the mold couple. Below the bed 11 are two forward ram posts 30 and 31 guided for vertical movement by a guide such as guide 32 illustrated in Figure 3. The drawings do not conveniently provide a section which shows the guide and post 31 but it is substantially identical to the guide 32.

Two especially adapted locking ram post members 60 and 61 are located to the rear, or left in Figure 3, area of the bed 11 and these locking ram posts 60 and 61 are guided in vertical movement by guides such as the guide 62 illustrated in Figure 3. Similarly, the drawings do not conveniently provide for illustration of the guide member for the post 61.

Centrally below the bed 11 is a hydraulic ram motor 35 and four fulcrum posts 36. A central spider 39 carried by the motor 35 is pivotally connected to four lever arms 37. Lever arms 37 are pivotally bearinged by pivots 38 on the fulcrum posts 36 as may be seen by inspection of the Figures 2 through 5. The ends of the lever arms 37 engage into notches on the bottom of the ram posts and are joined by lock pins 40 which serve largely to hold the members in operative relationship during rest periods. The actual force is transmitted by direct bearing of the arms 37 against the ram post members.

Heretofore, it has been proposed to employ separate hydraulic motors at the four corner locations in a manner similar to that set forth in the Cleveland patent. It has been found, however, that in the operation of the type of mold couple illustrated by the couple 15, that a twisting action very often is evidenced by reason of an uneven gripping of the molded material within the couple 15. Hence, regardless of safety measures employed, one hydraulic cylinder would tend to operate faster than another. Even a very slight twisting of the precision-made mold couple will cause a binding of its dowel pins 21 and very often prevent the separation of the sections. Such situation may or may not apply to the Cleveland type of apparatus but it is known to apply to the type of mold couple 15. Hence, this invention has solved the uniform breaking of a mold couple by the provision of the central apparatus working through fulcrum pivots. Absolute breaking force is thus assured.

The necessary force to break the mold sections apart is quite large. Hence the force applied by the hydraulic motor 35 must be quite large. Those familiar with hydraulic motors will understand that a motor designed to deliver a large force will generally not be employed for fast light-weight work for the simple reason that an altogether excess of fluid flow would be required in relationship to need. After the mold sections have been broken by an elevating lift of the ram post members, it is therefore convenient to have the actual large opening movement function taken over by lighter-duty, fast-operation apparatus. Such fast operation in this invention is provided by a curbed ram 46 which is guided in its reciprocable movement path by means of a plurality of guide bearings 46. A long stroke hydraulic motor 48 which has considerably less power than motor 35 is employed to drive the curved ram 46 through its reciprocable path. The hydraulic motor 48 is pivotally connected to the curved ram 46 by means of a pivot connection 50 and is mounted near the path of the table 10 by means of a pivotal connection 49. Hence, the ram motor 48 can deliver operative power and adjust to the position of the curved ram 46.

In operation, therefore, the mold couple 15 is dollied out upon the bed 11 to the position shown in Figure 3 whereupon the motor 35 is actuated to elevate the ram posts 30 and 31 and the locking ram posts 60 and 61 with a slow and powerful force to engage the pins 18 and 20 for the purpose of lifting the section 16 off of the section 17. Such elevated condition of section 16 is illustrated in Figure 4. Figure 4 represents the practical top limit of movement of the original breaking apparatus. After this condition is reached the hydraulic motor 48 is activated to drive the curved ram 46 upwardly into engagement with the pins 19 and cause a rapid elevation of the front portion of section 16 to substantially the position shown in Figure 5.

It must be understood that the circumstances involved in this invention are dictated by the nature of the molding couple 15. The sections of mold couple 15 cannot be hinged. Rectilinear lifting movement is required because of the guide dowel pins 21. However, swinging movement of the section 16 is desired in order to allow operator access to the interior of the mold without endangering the operator by reason of physical obstruction or exposure to the searing temperature of the mold couple. Hence the elevational effect of the curved ram 46 is orientated to cause a pivoting of the mold section 16 about the locking ram posts 60 and 61. Therefore, it is desirable to provide absolute assurance against accidental dislodgement of the mold section 16 while in its elevated position because otherwise an operator could be crushed were the section to fall upon him.

Figure 6:
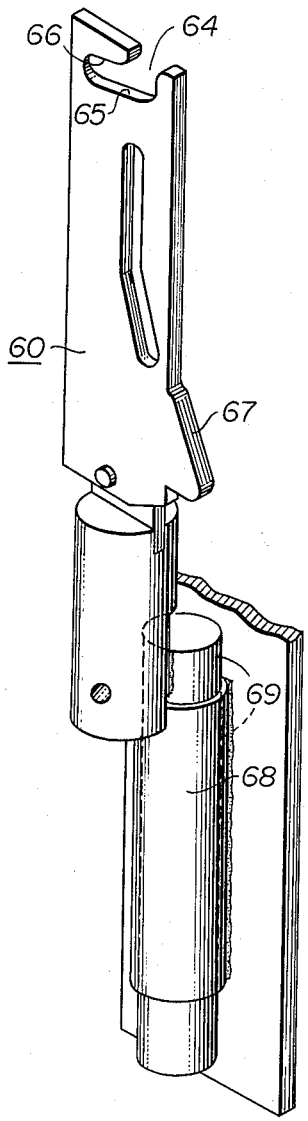
Figure 6 is a detail illustration of the guide and locking structure of the rear lifting post.

According to this invention a unique system and apparatus is provided to lock the section 16 into the grip of the machine and prevent accidental dislodgement. The locking ram posts 60 and 61 may be best understood by reference to Figure 6 of the drawings. There it will be seen that the post 60 is composed of track guided portion 55, pivotally carried at the upper end of a guide carriage composed of a bearing housing 68 carried on one leg 12 of the table and a guide rod 69 guided within bearing 68.

The top end of the portion 55 is formed with a unique notch 63 for a mouth 64 opening at the top of the section. A lateral slot portion 65 extends from the mouth area 64 and is defined in part by a top wall 66. The top wall 66 is slanted slightly as shown in the drawing with respect to its normal retracted position of Figure 3. When elevational movement of the post 60 takes place, a cam shoulder 67 carried by the portion 55 engages the guide 62 and causes the entire portion 55 to pivot in the direction of the pin 19. A slot 56 in the portion 55 and a guide pin 57 carried by the guide 62 provide a precise lateral swinging movement of the portion 55 in the forward direction. Hence, after the lifting force has caused a separation of the section 16 and the elevating apparatus is able to move upwardly to lift section 16 away from section 17, section 17 becomes operative to swing the track guided portion 55 and hence securely lock the section 16 upon the posts 30, 31 and 60, 61.

The swinging action of track guided portion 55 causes the portion of the lateral slot 65 with its top wall 66 to come to a perfectly lateral position whereas it was formerly in an inclined position. Compare Figures 3 and 4.

Figure 5:
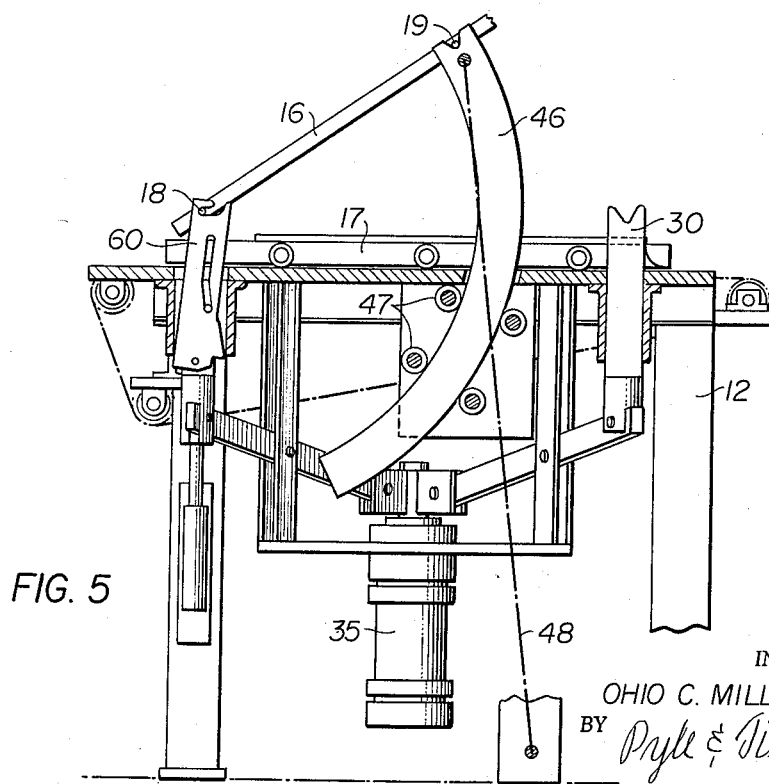

When the fast swinging movement by curved ram 46 takes place as illustrated in Figure 5, the curved notch on the end of ram 46 fastens into the pin 19 and hence the locking action is maintained on section 16. Furthermore as the swinging action takes place the tendency of the section 16 will be to drive pin 18 to the back end of the lateral slot 65 and hence dislodgement movement of the section 16 is impossible in the absence of intentional displacement lifting.

As thus far described, the unique consort of action between the force breaking movement and the fast lifting operation together with the unique locking operation during swinging movement will be readily understood. However, a still further advantage which has been devised with respect to this invention is the ability of this apparatus to operate with any platen press without special interconnection devices. The bottom platen of such press generally is actuated by a power ram which is illustrated in Figure 1 but not numbered and hence the mold couple 15 is elevated with respect to the bed 11 after being inserted into the press. According to this invention, a drive block 75 is provided with two notched catch members 76. A handle 22 on the mold section 17 is engaged into the notched catch members 76. Reciprocable drive of the block 75 will therefore dolly the mold couple 15 into and out of the platen press, if the bed of the press is lowered to its register position with respect to the elevation of the bed portion 11. A chain drive 77 operates over a series of sprockets and guides constituting the guide sprocket system 78. A gear multiplier device 79 operates by drive force received from hydraulic motor rack device 80. Proportioning of the gear multiplier drive gear ratios and the stroke of motor 80 will cause a substantially precise reciprocable drive of the block 75 and suitable stop blocks and other types of precision alignor devices may be employed to cause minute precision alignment of the block 75 or the mold couple 15 as precision alignment is necessary.

By the provision of the notched catch members 76 on the drive block 75 separation and re-engagement of the mold couple 15 with the reciprocable drive apparatus is self-acting and positive. Actuation of the apparatus to drive the block 75 in a direction to dolly the mold couple 15 into the press will stop at a position wherein the handle 22 projects from the platen press and lifting of the mold couple will simply elevate the handle away from the catch member 76. A return of the press to its unloaded position will lower the handle 22 into the catch members 76 before the press releases its grip upon the mold couple and hence before any shifting or any relief position laterally can take place.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In combination, a mold couple having a top and a bottom mold plate matable together to define molding cavity means within the couple, said top mold plate having a plurality of lift engagement surfaces, said mold plates joined as a couple presenting said lift engagement surfaces accessible from directly below the couple, a mold couple receiving bed, locator means determining an engaged position of said mold couple on said bed, said mold couple removably positionable on said bed in a relative position determined by said locator means, means locking said mold couple with the exception of said top plate against vertical movement with respect to said bed, a first elevator system of low speed and great power, said first system having a plurality of symmetrically positioned vertically guided lift posts spaced below selected ones of said mold couple lift engagement surfaces, a unitized drive structure to move said lift posts upwardly to contact said lift surfaces and lift the top mold plate vertically with a uniform lifting action from the couple, said unitized drive structure having a central drive means with mechanical linkage extending from the drive means to each of said lift posts, each said linkage proportioned to impart a lift force to its associated lift post in synchronism to each of the other posts, means providing hinge pivot engagement between two of said lift posts and said top plate, and a separate second tilt elevator system of high speed and lesser power, said second system positioned to contact and lift said top plate at a location spaced from said hinge pivot engagement and acting in a direction to swing said plate about said hinge pivot engagement, said second system having means providing an arcuate upward tracking path of movement guiding the elevator contact with the plate on an arcuate path corresponding to a segment of a circle around said hinge pivot as a center, all said elevator contacts with said mold couple being fully separable by reverse movement of the elevator systems, and said mold couple being laterally shiftable to and from said bed when the systems are retracted.

2. In the combination of a table having a mold couple bed and a mold couple of at least a top and bottom mold plate removably slidable upon said bed, the provision of an improved mold separating system, comprising a first elevator system below said table bed, said first elevator system movable vertically upwardly with respect to said bed, a plurality of spaced lift post means carried by said first elevator system engageable with said top mold plate, a vertically hydraulic ram positioned centrally below said table, a plurality of pivoted lever arms, one for each lift post, interconnected between said ram and post to impart a synchronized vertical movement of all said posts from one drive power source, said first elevator system thereby exerting a vertical lift upon said top plate with respect to said bottom mold plate, and a second elevator system below said table bed, said second elevator system movable upwardly and arcuately with respect to said bed, means carried by said second elevator system engageable with said top mold plate as the elevator system passes thereby, means operating said second system sequentially after the first system to open the top mold plate, and said means operating said second system before the first system to close the top mold plate, said second elevator system thereby exerting a tilting movement to the elevated top mold plate as it is supported upon the first elevator system.

3. A power table for first breaking apart a mold couple and thereafter swinging one part of said mold couple to an angular open position, comprising, a bed to receive a flat rectangular mold couple in a horizontal position, means supporting said bed at a selected elevational position, locator means determining an engaged position for a mold couple on said bed, means positioned to lock a mold couple bottom plate against vertical movement with respect to said bed, a first elevator system of low speed and great power, said first elevator system having four symmetrically positioned vertically guided lift posts, a hydraulic piston and cylinder power motor located centrally and below said bed in a vertical position, four lever arm power link members pivotally attached at one end to said power motor and each member pivotally attached to one of said four lift posts, each said lever arm pivotally supported at a fulcrum point intermediate the ends thereof to convert and transfer power in uniform synchronism from said power motor to the lift post operated thereby, and a second elevator system of high speed and lesser power, said second elevator system including first and second guide track means spaced laterally of said table and between two of said posts of the first elevator system, a first curved post guided upwardly with respect to said bed by said first guide track means, a second curved post guided upwardly with respect to said bed by said second guide track means, and power means of a speed greater than said power motor driving said first and second curved post, and means operating said second system sequentially after the first system to open the top mold plate, said means operating said second system before the first system to close the top mold plate, said second elevator system thereby exerting a tilting movement to the elevated top mold plate as it is supported upon the first elevator system.

4. In a power table having a bed to receive a mold couple and having an elevator system located below said bed to move upwardly with respect to said bed to engage and separate plates of a mold couple held on said bed, the provision of an improved mold couple drive and positioning system, comprising, a drive block carriage, track means extending across said bed, said carriage mounted to reciprocate along said track means, said carriage having vertically extending hook means with hook slot means opening upwardly, drive means driving said carriage between a first and second station at extreme ends of said bed, limit switch means contactable by said carriage and in control of said drive means, said limit switch means determining the said first and second station positions of said carriage, whereby a horizontal handle loop on a mold couple may be dropped downwardly into said hook slot means and thereafter be shifted relative to said bed.

5. In the combination of a table having a mold couple bed and a mold of at least a top and bottom mold plate removably slidable upon said bed, the provision of an improved mold separating system, comprising, a first elevator system below said table bed, said first elevator system movable vertically upwardly with respect to said bed, means carried by said first elevator system engageable with said top mold plate as the elevator system passes thereby, said first elevator system thereby exerting a vertical lift upon said top plate with respect to said bottom mold plate, and a second elevator system below said table bed, said second elevator system movable upwardly and arcuately with respect to said bed, means carried by said second elevator system engageable with said top mold plate as the elevator system passes thereby, means operating said second system sequentially after the first system to open the top mold plate, and said means operating said second system before the first system to close the top mold plate, said second elevator system thereby exerting a tilting movement to the elevated top mold plate as it is supported upon the first elevator system.

6. In combination, a bed, a mold couple removably positioned on the bed and having a top and a bottom mold plate matable together to define molding cavity means within the couple, locator means determining an engaged position of said mold couple on said bed, means locking said mold couple bottom plate against vertical movement with respect to said bed, said top mold plate having a plurality of lift engagements, a first elevator system of low speed and great power, said first system having a plurality of symmetrically positioned vertically guided lift posts, each spaced below a mated one of said mold couple lift engagements, means to move said lift posts upwardly to contact said mated lift engagements and lift the top mold plate vertically from the couple, means providing hinge pivot engagement between at least one of said lift posts and said top plate, and a second elevator system of high speed and lesser power, said second system being positioned to contact other of said lift engagements spaced from said hinge pivot engagement, said second elevator acting in a direction to swing said plate about said hinge pivot engagement, said second system having means providing an upward tracking path of movement guiding the elevator to plate contact on a path around said hinge pivot, all said elevator contacts with said mold couple being fully separable by reverse movement of the elevator systems, and said mold couple being laterally shiftable to and from said bed when the elevator systems are retracted.

7. In the combination defined in claim 6, said means providing hinge pivot engagement being a reversed L slot opening from the top of the lift post, with the side slot running in a direction away from the lift engagements of the second elevator system, and the engagement surface being a pin structure to fit into the slot.

8. In combination, a mold couple comprising a top and a bottom mold plate, said top mold plate having laterally positioned lift surfaces spaced around the periphery thereof, a mold receiving bed to carry said couple, locator means determining an engaged position of said mold couple on said bed, means locking said couple except for said top plate to said bed against vertical movement, a plurality of elevator members with vertically slotted contact members spaced below said lift surfaces of the top mold plate, said contact members being elevatable to engage said lift surfaces and lift said top mold plate of said couple, at least one said vertically slotted contact member having a lateral slot branch, cam track means guiding said one member having the slot branch laterally as it rises to hook the said slot branch upon the mated lift surfaces, an arcuate ram track means below said bed and spaced from said branch slotted member, said track means guiding said arcuate ram to reciprocate vertically in an arcuate path around said one elevator member which has said lateral slot branch, means separate from said elevator members driving said arcuate ram means, said arcuate ram means abuttable with one said lift surface to lift and tilt said top plate around the said branch slotted ram as a pivot.

9. In combination, a mold couple comprising a top and a bottom mold plate, said top mold plate having laterally positioned lift surfaces spaced around the periphery thereof, a mold receiving bed to carry said couple, locator means determining an engaged position of said mold couple on said bed, means locating said couple except for said top plate to said bed against vertical movement, a plurality of elevator members with vertically slotted contact members spaced below said lift surfaces of the top mold plate, means to drive said elevator members in a vertically reciprocable path, said contact members being elevatable to engage said lift surfaces and lift said top mold plate of said couple, at least one vertical slot of a member having a lateral slot branch, and cam track means guiding said one member laterally as it rises to hook the said slot branch upon the mated lift surfaces.

References Cited in the file of this patent

UNITED STATES PATENTS

| | | |
|---|---|---|
| 1,797,176 | Nelson | Mar. 17, 1931 |
| 1,809,856 | Lehman | June 16, 1931 |
| 1,871,642 | Willshaw et al. | Aug. 16, 1932 |
| 2,135,299 | Benander | Nov. 1, 1938 |
| 2,272,887 | Allen | Feb. 10, 1942 |
| 2,624,915 | Corson | Jan. 13, 1953 |
| 2,642,782 | Chapman | Jan. 23, 1953 |
| 2,718,030 | Collins et al. | Sept. 20, 1955 |
| 2,827,683 | Benart et al. | Mar. 25, 1958 |
| 2,912,717 | Yarrison et al. | Nov. 17, 1959 |